United States Patent [19]

Kumakura

[11] 4,327,887
[45] May 4, 1982

[54] MOUNTING CLIP
[75] Inventor: Masaaki Kumakura, Tokyo, Japan
[73] Assignee: Negurosu Electrical Ind. Co. Ltd., Tokyo, Japan
[21] Appl. No.: 52,574
[22] Filed: Jun. 27, 1979
[30] Foreign Application Priority Data
Sep. 27, 1978 [JP] Japan .................................. 53-118758
[51] Int. Cl.³ .............................................. F16L 3/08
[52] U.S. Cl. .................................... 248/73; 248/74 B; 248/229
[58] Field of Search ...................... 248/73, 74 A, 74 B, 248/74 PB, 544; 24/20 TT

[56] References Cited
U.S. PATENT DOCUMENTS

| 397,036 | 1/1889 | Steussy | 248/74 B |
|---|---|---|---|
| 1,786,612 | 12/1930 | Heslop | 24/20 TT |
| 1,860,861 | 5/1932 | Knutson | 248/73 X |
| 2,318,816 | 5/1943 | Tinnerman | 24/20 TT |
| 3,185,419 | 5/1965 | Kindorf | 248/73 |
| 3,301,514 | 1/1967 | Sugaya | 248/73 |
| 3,515,363 | 6/1970 | Fisher | 248/74 PB X |
| 4,157,800 | 6/1979 | Senter | 24/20 TT X |

Primary Examiner—William H. Schultz

[57] ABSTRACT

A mounting clip for holding the conduit or pipe and similarly acting fittings in which a unitary clip comprising two wriggly strip members of substantially the same structures and configurations having at each end a detention bore of substantially trapezoidal shape with a locking lug externally projecting from the bottom of the trapezoidal detention bore so as to engage with a corner portion of the opposite trapezoidal detention bore for interlocking of the two strips. The mounting clip is conveniently associated with a clamping body of substantially U-shape which is releasably attached to an angle member of the construction.

12 Claims, 4 Drawing Figures

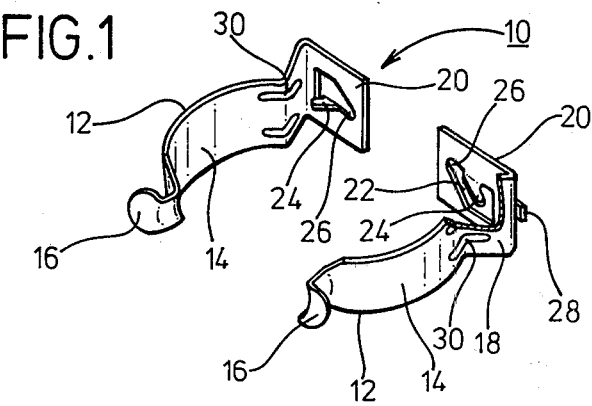
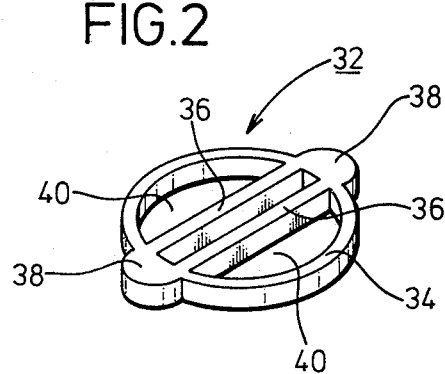
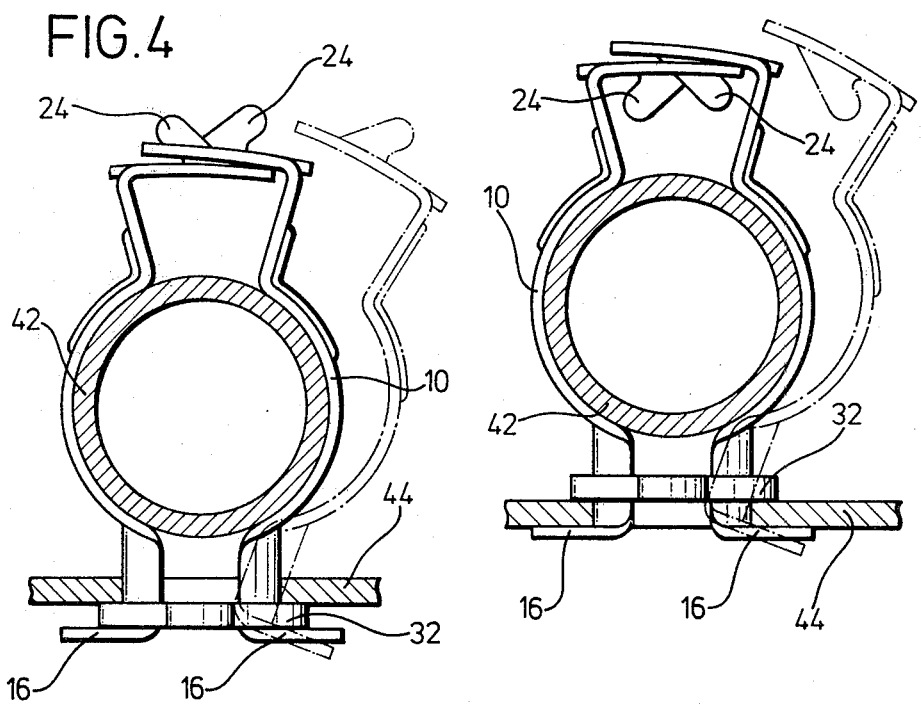

MOUNTING CLIP

TECHNICAL FIELD OF INVENTION

The invention relates to a metal fitting and more particularly to a mounting clip for use in firm holding of conduits or pipes in connection with angles and/or other steel beams of building or other structures such as scaffolding, temporary buildings and the like.

BACKGROUND ART

Hitherto, a conduit or a pipe is fixed to an angle member or a steel beam of a building or a bridge which is directly provided with a bore or recess for receiving a U-shaped bolt for clamping. However, this conventional manner disadvantageously causes a troublesome fastening operation with less efficiency and with relaxation or disengagement of a fastener and an inconvenient operation at a high place on the building. For example, when a conduit is suspended by such a mounting clip at a high place on a building, it is quite troublesome and inefficient to insert the bolt into the bores in the straight end portions of the mounting clips and to screw nuts onto the bolt by a wrench while supporting the weight of the conduit. Furthermore, there is a possibility of falling of the bolts and/or nuts which is hazardous to workers who work below the high place where the mounting clip attaching operation is taken place.

In order to overcome the foregoing disadvantages, there has been provided an improved clip which is disclosed in the U.S. Pat. No. 3,301,514. This improved clip comprises two wriggly strip members one end of which having a detention bore and the other end having a lug adapted to engage with the detention bore. Accordingly, the improved clip requires two strip pieces of different configuration which are inconvenient and costly for manufacture.

SUMMARY OF THE INVENTION

The invention as claimed is intended to provide a remedy. It solves the problem of how to design a clip for holding the conduit or pipe and similarly acting fittings in which a unitary clip comprising two wriggly strip members of substantially the same structures and configurations having at each end a detention bore of substantially trapezoidal shape with a hook lug externally projecting from the bottom of the trapezoidal detention bore so as to engage with a corner portion of the opposite trapezoidal detention bore for interlocking of the two strips.

The two strip members may be coupled integrally at their opposite ends for the convenient connection to the desired object and particularly to the clamping body of U-shape.

The advantages offered by the mounting clip according to the invention are mainly that the pipe or the conduit may be firmly and conveniently fixed to the desired position on the steel beam or angle in a short time and with a simple operation.

Another aspect of the invention is to provide a pipe holding device comprising a clamping body of substantially U-shape which is releasably attached to an angle member of the construction through a convenient fastening means and a unitary clip consisting of two wriggly strip members of substantially the same structures and configurations having at each end a detention bore of substantially trapezoidal shape with a hook lug externally projecting from the bottom of the trapezoidal detention bore so as to engage with a corner portion of the opposite trapezoidal detention bore for interlocking, said unitary clip being detachably connected to the clamping body for holding the pipes.

BRIEF DESCRIPTION OF THE DRAWINGS

One way of carrying out the invention is described in detail below with reference to drawings which illustrate preferred embodiments, in which:

FIG. 1 is a perspective view of a unitary clip according to the invention;

FIG. 2 is a perspective view of a linking loop for the unitary clip of FIG. 1;

FIG. 3 is a lateral view of the clip in a closed position for clamping a pipe shown in section;

FIG. 4 is a lateral view of the clip of another embodiment in a closed position for clamping the pipe shown in section;

BEST MODE FOR CARRYING OUT THE INVENTION

Figure 5:
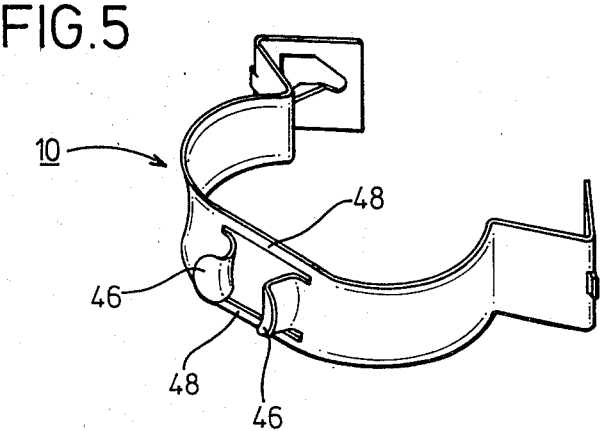
FIG. 5 is a perspective view of an integrally formed clip of another embodiment.

In FIG. 1, a unitary clip 10 according to the invention comprises two wriggly strip members 12, 12 of substantially the same structure and configuration which includes an arm portion 14 having at its one end a base tongue 16 and at its opposite end a stem portion 18 in contiguous with a coupling element 20. In the coupling element 20 is formed a detention bore 22 of substantially trapezoidal form with a locking lug 24 which is projected externally from the bottom portion of the trapezoidal detention bore 22 which includes a tip corner portion 26 for receiving the locking lug 24 when two strip members 12, 12 are interlocked one another. It will be appreciated that two detention bores 22, 22 when two strip members 12, 12 are confronted to provide a unitary clip are positioned unsymmetrically, so that the locking lug 24 is smoothly received into the tip corner portion 26 of the detention bore 22 when the clamping operation is carried out.

Across the boundary between the coupling element 20 and the stem 18 there is provided a raised tab 28 which has a function to prevent the fastening tool such as pliers and pinchers from slipping off when the unitary clip is closed for the clamping purpose.

Further across the boundary between the arm 14 and the stem 18, there may be provided two or more ribs 30 for enforcement as well as retention of the boundary portion.

In FIG. 2, a linking loop 32 for use in connection with the unitary clip 10 is comprised of an annular frame 34 and bridge members 36, 36 acrossed the annular frame 34 with symmetrical protuberances 38, 38. In the embodiment of FIG. 3, the linking loop 32 is placed inside a base plate 44. Between the bridge members 36, 36 and the annular frame 34 there are formed two confronting semi-circular spaces 40, 40 into which the base tongues 16, 16 of the strip members 12, 12 are inserted for engagement therewith as shown in FIGS. 3 and 4 which also show a pipe 42 firmly clamped by the unitary clip 10 in relation to the base plate 44.

A unitary clip of FIG. 4 is concerned with another embodiment of the invention in which the locking lugs 24, 24 are projected outwardly and the linking loop 32 is placed outside the base plate 44.

Figure 6:
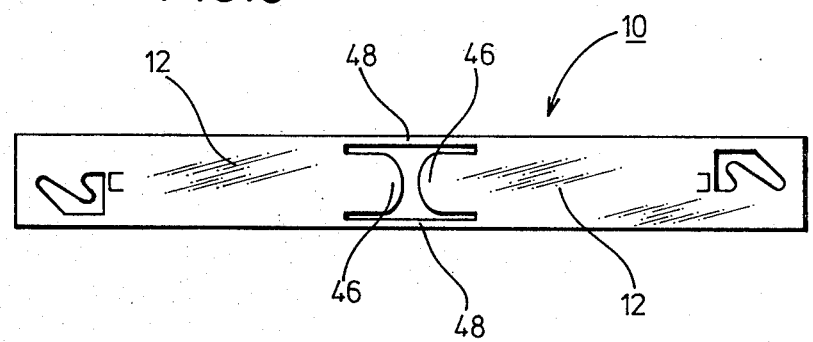
FIG. 6 is a plan view of the clip of FIG. 5.
Figure 7:
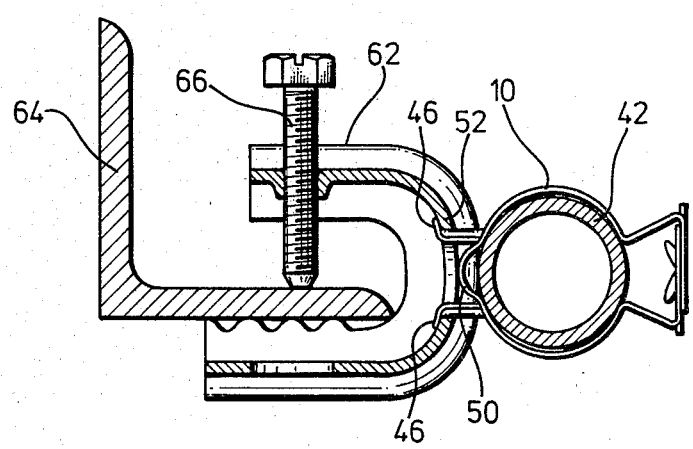
FIG. 7 is a lateral view of the clip of FIG. 5 in a closed position for holding the pipe in association with the clamping body.

In the embodiment of FIGS. 5 to 7, the strip members of the unitary clip are formed integrally providing base tongues 46, 46 opened outwardly with two side bridges 48, 48 which provide elastic seats 50, 50 against a base plate 52 when the unitary clip 10 is closed for clamping the pipe 42, so that the unitary clip 10 is more urged against the base plate 52.

Figure 8:
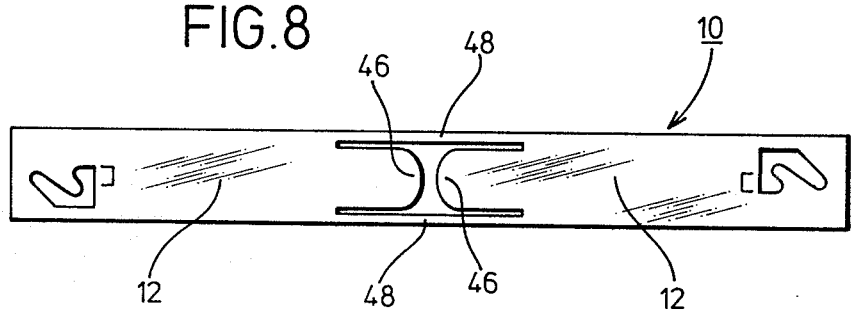
FIG. 8 is a plan view of an integral clip of a further embodiment.
Figure 9:
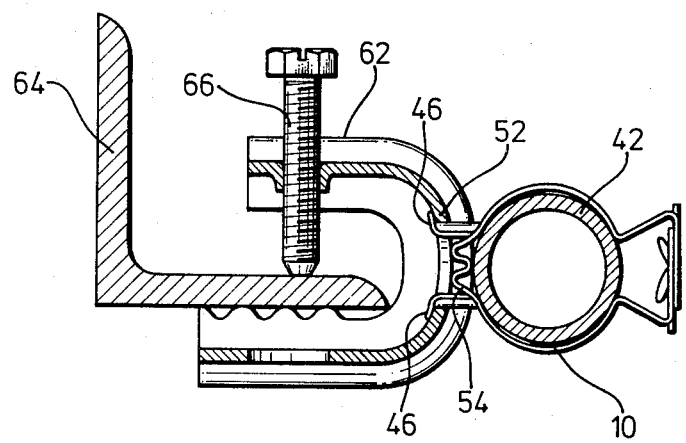
FIG. 9 is a lateral view of the clip of FIG. 8 in a closed position for holding the pipe in association with the clamping body.

FIGS. 8 and 9 show a further embodiment of the integrally formed clip strip similar to that of FIG. 6 in which the side bridges 48, 48 are extended longer than those of the clip strip 10 in FIG. 6, so that the elastic seats 54 are formed into a staggered shape as shown in FIG. 9 when the unitary clip 10 is closed for clamping the pipe 42 and also the lengths of the base tongues 46, 46 are prolonged. The prolonged length of the base tongues permits the pipe to be clamped to ride on the beads of the base body as hereinafter fully described.

Figure 10:
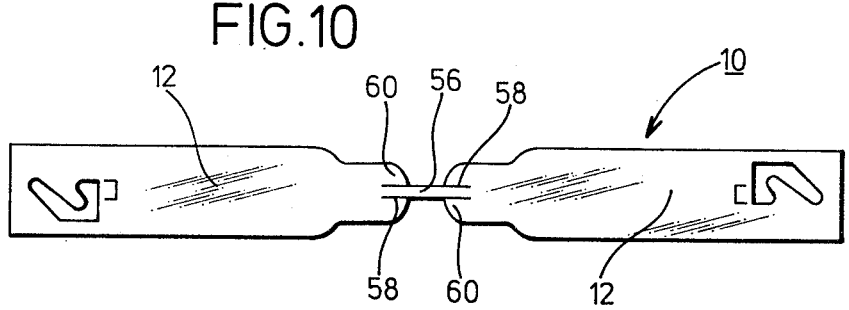
FIG. 10 is a plan view of the clip of still a further embodiment.
Figure 11:
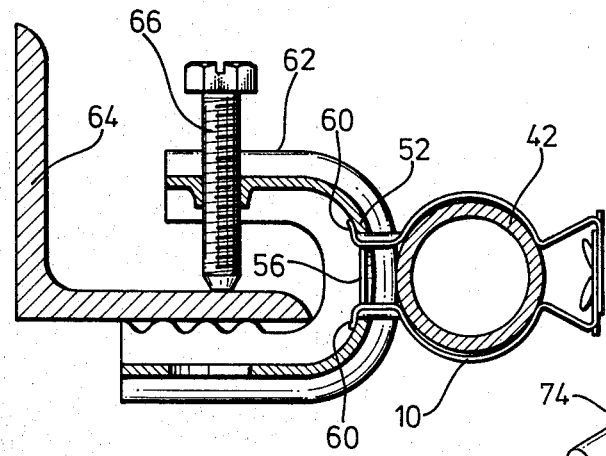
FIG. 11 is a lateral view of the clip of FIG. 10 in a closed position for holding the pipe in association with the clamping body.

In another embodiment of FIGS. 10 and 11, the symmetrical clip strips 12, 12 are integrally connected through a single connecting element 56 with confronting symmetrical splits 58, 58 which permits to provide divided base tongues 60, 60.

Figure 12:
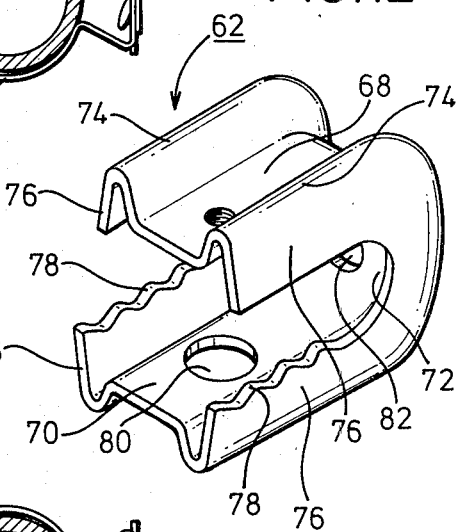
FIG. 12 is a perspective view of the clamping body according to the invention.
Figure 13:
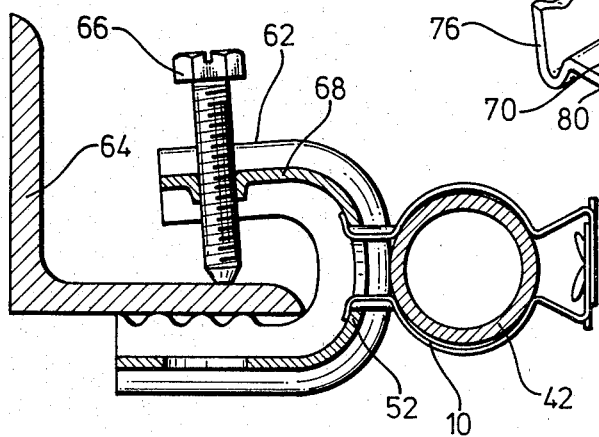
FIG. 13 is a lateral view of the clip of FIG. 1 in a closed position for holding the pipe in association with the clamping body of substantially U-shape, an upper plate of which being somewhat tilted downwardly.

As best shown in FIG. 11, a clamping body 62 is secured to an angle 64 by means of a convenient fastening bolt 66. The clamping body 62 is comprised of an upper plate 68, a bottom plate 70 and a web portion 72 which are formed integrally and provided at their opposite edges with beads 74, 74 which includes external walls 76, 76 as shown in FIG. 12. On the edges of the walls 76, 76 abutting to the bottom plate 70, there are provided toothed edges 78, 78 to grasp the surface of the angle 64. The bottom plate 70 and the web portion 72 are provided with apertures 80 and 82 to receive the engaging tongues of the unitary clip.

Figure 14:
FIG. 14 is a lateral view of an improved fastening screw to be used according to the invention.

The upper plate 68 of the base body 62 may be somewhat tilted downwardly to avoid undesired relaxation of the fastening means such as a bolt 66 as shown in FIG. 14 and a tip of the bolt 66 may preferably be recessed to provide an annular wedge 84 which somewhat penetrates into an inner surface of the angle 64 when the bolt 66 is fastened against the angle 64 thereby to achieve an increased engagement of the tip of the bolt with the face of the angle member 64. When the clamping base body 62 is compelled to disengage from the angle member 64 under the certain stress, the wedged end of the bolt 66 further penetrates into the surface of the angle member thereby to disturb disengagement of the clamping base body 62 from the angle member.

When the pipe holding device in accordance with the invention is practically used, the clamping base body 62 is first secured to the angle member 64 at the desired position. As hereinbefore described, the fastening bolt 66 is provided at its top end with the annular wedge 84 and also the bottom plate 70 has toothed edges 78, 78, between which a fraction of the angle member 64 is firmly sandwiched to achieve a rigid fixing of the clamping base body 62 to the angle member 64. Then the unitary clip is connected at its base tongues with the aperture 82 provided in the web portion 72 of the clamping base body 62 and subsequently the pipe 42 is firmly carried by the pair of the clip strip members 12. The aperture 80 of the bottom plate 70 and the aperture 82 of the web portion 72 may be selectively used as desired according to the purpose.

The unitary clip having inwardly projected locking lugs 24, 24 as shown in FIG. 3 has such the advantages that any risk to injure the operator's hands or fingers or the other constructional matters such as pipes or wires may positively be avoided.

As hereinbefore fully described, where the unitary clip including two separate strip members 12, 12 is used, the tongues 16, 16 of the strip members 12, 12 are previously associated with the linking loop 32 for convenient, smooth and rapid engaging operation of the unitary clip with the base body 62 with the increased working efficiency particularly at the high operating place. Further, the unitary clip including two separate strips of the same configuration and structure is convenient in mass production, packing and the stock control.

Without further elaboration, the foregoing will so fully illustrate the invention that others may, by applying the current or future knowledge, readily adapt the same for use under various conditions of service.

What is claimed is:

1. A clip for mounting a conduit or the like comprising, two wriggly strip members of identical configuration and structure, each of which has a center arm portion of outwardly curved configuration adapted to accomodate and hold a conduit in cooperation with the center arm portion of the other strip member, an outwardly bent tongue at one end having a transverse curvature, and an inwardly bent flat extension at the other end, said extension being provided with a detention bore of substantially trapezoidal shape and a locking lug projecting externally of the surface of the extension from the larger base of the trapezoidal detention bore, said strip members being arranged in opposition to each other about the conduit, so that the outwardly bent tongues are adapted to engage and be held in a circular opening of a support member having substantially a conforming curvature and the inwardly bent extensions lie one above the other with each locking lug passing through the trapezoidal detention bore of the opposing strip and engaging with a corner portion of the opposing trapezoidal detention bore adjacent the smaller base thereof to thereby interlock the two strips.

2. The clip according to claim 1 wherein said locking lug projects inwardly in the direction of said center arm.

3. The clip according to claim 1 wherein said locking lug projects outwardly of the said center arm.

4. The clip according to claim 1, wherein said extension is provided with a tab extending parallel to the plane and opposite to the bend thereof.

5. The clip according to claim 1 including at least one reinforcing rib formed in said strip between the center arm portion and the inwardly bent extension.

6. The clip according to claim 1 including a locking loop for holding the outwardly bent tongues comprising an annular frame having a pair of parallel chord members and symmetrical protuberances.

7. The clip according to claim 1, wherein the two strip members are integrally joined adjacent their outwardly bent tongues by a pair of bridging members extending on each side of said tongue.

8. The clip according to claim 7, wherein said bridging members are elongated to extend the length of said tongues.

9. The clip according to claim 1, wherein the two strips are integrally joined adjacent their outwardly bent tongues by a single bridge member.

10. The clip according to claim 1, including a clamping body comprising a U-shaped member having an upper plate, a lower plate and a connecting web, at least said upper and lower plates having a U-shaped cross section formed with beads formed along their opposing external edges.

11. The clip according to claim 10, wherein the inner edges of the walls of at least one of the upper and lower arms is provided with indentations.

12. The clip according to claim 10, wherein said clamping body is provided with an aperture to receiving said bent tongues.

* * * * *